US007684997B2

(12) United States Patent
Reichelsheimer

(10) Patent No.: US 7,684,997 B2
(45) Date of Patent: Mar. 23, 2010

(54) MACHINE READABLE COLORED ENVELOPES

(75) Inventor: Jay Reichelsheimer, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 329 days.

(21) Appl. No.: 11/645,999

(22) Filed: Dec. 27, 2006

(65) Prior Publication Data

US 2008/0162162 A1 Jul. 3, 2008

(51) Int. Cl.
*G06Q 10/00* (2006.01)

(52) U.S. Cl. .......................................................... 705/1

(58) Field of Classification Search ...................... 705/1
See application file for complete search history.

(56) References Cited

U.S. PATENT DOCUMENTS

| | | | | | |
|---|---|---|---|---|---|
| 3,658,534 | A * | 4/1972 | Ishitani et al. | 430/270.1 |
| 3,995,741 | A * | 12/1976 | Henderson | 209/3.3 |
| 4,126,717 | A | 11/1978 | Mazzola | 427/220 |
| 4,927,180 | A * | 5/1990 | Trundle et al. | 283/70 |
| 5,289,547 | A | 2/1994 | Ligas et al. | 382/7 |
| 5,518,858 | A | 5/1996 | Dyukova et al. | 430/167 |
| 5,524,070 | A * | 6/1996 | Shin et al. | 382/274 |
| 5,551,973 | A | 9/1996 | Oliver et al. | 106/22 B |
| 5,593,486 | A | 1/1997 | Oliver et al. | 106/22 A |
| 5,872,648 | A | 2/1999 | Sanchez et al. | 359/290 |
| 6,140,012 | A | 10/2000 | Smithey et al. | 430/270.14 |
| 6,616,964 | B1 | 9/2003 | Hampp et al. | 427/7 |
| 6,652,959 | B2 | 11/2003 | Foucher et al. | 428/327 |
| 6,858,564 | B2 | 2/2005 | Wehr et al. | 503/206 |
| 6,908,505 | B2 | 6/2005 | Lawandy et al. | 106/31.23 |
| 2003/0116747 | A1* | 6/2003 | Lem et al. | 252/62.51 R |
| 2006/0035202 | A1* | 2/2006 | Broxey et al. | 434/317 |
| 2006/0172135 | A1* | 8/2006 | Agrawal et al. | 428/411.1 |
| 2007/0053856 | A1* | 3/2007 | Ribi et al. | 424/61 |
| 2007/0206982 | A1* | 9/2007 | Roth et al. | 400/120.01 |
| 2008/0004176 | A1* | 1/2008 | Cullen et al. | 503/200 |

FOREIGN PATENT DOCUMENTS

EP 0 305 211 A2 * 3/1989

OTHER PUBLICATIONS

Ayshford, Hilary, "Foiling the Fakers With Modern Tricks (Special Report: Closures and Security)," Packaging Week, v11, n32, p. 24(2), Feb. 1, 1996.*

(Continued)

*Primary Examiner*—John W Hayes
*Assistant Examiner*—Nathan Erb
(74) *Attorney, Agent, or Firm*—George M. Macdonald; Angelo N. Chaclas

(57) ABSTRACT

Systems and methods for providing a machine readable colored envelope and systems and methods for processing such envelopes are described. In certain examples, the machine readable colored envelopes are colored using a reversible negative photochromic colorant that bleaches when exposed to an activation energy such as ultraviolet radiation and returns to its original color after the activation energy is removed. In another example, the colorant has more than one stable color state.

13 Claims, 4 Drawing Sheets

OTHER PUBLICATIONS

Photochromic Doped Sol-Gel Material for Fiber-Optic Devices, Journal of Sol-Gel Science and Technology, Publisher: Springer Netherlands; vol. 8, Nos. 1-3, pp. 931-935, Feb. 1997, by D. Levy et al. ISSN 0928-0707 [Print], 1571-4846 [On-Line].

Organic Photochromism (IUPAC Technical Report); International Union of Pure and Applied Chemistry, Organic Chemistry Division, Commission on Photochemistry. Pure Applied Chemistry, vol. 73, No. 4., pp. 639-665, 2001. Prepared for publication by Henri Bouas-Laurent and Heinz Durr.

* cited by examiner

MACHINE READABLE COLORED ENVELOPES

CROSS-REFERENCE TO RELATED APPLICATION

This application is related to commonly-owned, co-pending application Ser. No. 11/645,910, entitled "Method and System for Hiding Information" to Reichelsheimer, et al. and filed herewith, which related application is incorporated herein by reference.

FIELD OF THE INVENTION

The present invention relates to a system and method for providing machine readable colored envelopes and more particularly in certain embodiments to systems and methods for processing machine readable colored envelopes colored with a photochromic colorant.

BACKGROUND

Mailing machines including postage metering systems are known in the art including the DM SERIES of mailing machines available from Pitney Bowes Inc. of Stamford, Conn. A postage metering system applies evidence of postage, commonly referred to as postal indicia, to an envelope or other mailpiece (directly or on a label to be applied thereto) and accounts for the value of the postage dispensed. The postage metering systems typically employ a red fluorescent ink to imprint a postage indicium although it is not the only color used. If a colored envelope is used for a mail piece, there may not be sufficient contrast from the indicium.

For example, during the end of year holiday season, it is common for business to send greeting cards to customers and colleagues. Such cards may not have white envelopes but may be processed by a company mailroom employee using a postage meter to apply postage. A typical postage meter utilizes. Such an indicium might not have significant contrast from the envelope and might not be easily read optically by a mail processing/sorting machine or by the naked eye. Additionally, during the Valentine's Day holiday in the United States, many greeting cards are mailed in colored envelopes such as pink or red envelopes. The sender may use a postage meter for postage payment. However, the user might intend to utilize a stamp but might then have the mailpiece collected by a mail aggregator service that would then apply a postage indicium. Accordingly, since more mail is being aggregated, it is more likely that a postage indicium will be applied to an envelope and readability contrast may become a problem in mail processing/sorting.

Thermochromic compositions of color formers and Lewis acids have been described such as in U.S. Pat. No. 6,908,505 B2, issued Jun. 21, 2005 that describes a two-layer reversible thermochromic system printed over a substrate and that transition from colorless to a colored state. One of the challenges that mailing machine manufactures and mail processing entities have is that they must deal with many different types of envelopes. For example, in the United States, the Unites States Postal Service (USPS) mandates certain physical characteristics of mail in the Domestic Mail Manual (DMM). However, a wide range of media types may be used for envelope substrates.

As barcode use becomes more widespread on mail pieces to facilitate the use of value added services and postage revenue security schemes it is imperative that these barcodes are machine readable with optical sensors such as the USPS Wide Field of View camera (WFOV). To insure barcode readability, flat, light-colored backgrounds may advantageously be used. The USPS might even decide to limit the customer's envelope use to the types that enable readability or have the user print indicia on controlled stock such as labels that are then adhered to the mailpiece. Both of those solutions have disadvantages including adding extra cost to the mailings and by limiting the advertising that can be done.

Accordingly, there is a need for a machine readable colored envelope that is easily processed by mail processing/sorting equipment. Additionally, there is a need for a system and method for processing reversible photochromic colored envelopes in mail processing/sorting systems including reversible "negative photochromatic" colorants. Furthermore, there is a need for a system and method for processing a single layer indicium printing on a reversible thermochromic colored envelope in mail processing/sorting systems.

SUMMARY

The present application describes illustrative embodiments of a machine readable colored envelope and systems and methods for processing such envelopes. In additional illustrative embodiments, the machine readable colored envelopes are colored using a reversible "negative photochromic" colorant that bleaches when exposed to an activation energy such as ultraviolet radiation and returns to its original color after the activation energy is removed. In a further alternative, the colorant has more than one stable color state.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Figure 1:
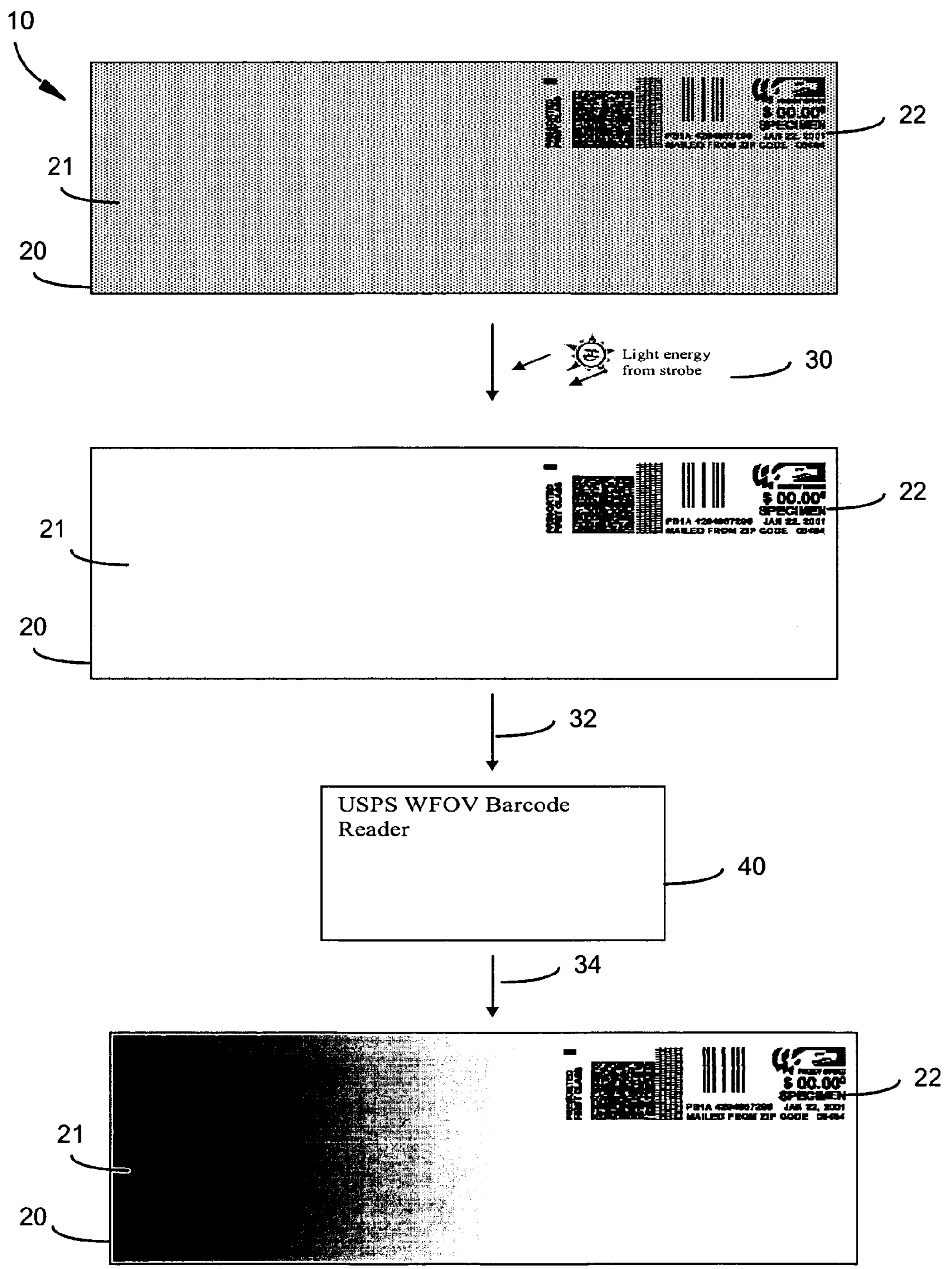
FIG. 1 is a schematic view of a unit of mail processing/sorting equipment processing a mailpiece having a machine readable colored envelope according to an illustrative embodiment of the present application.

The illustrative embodiments of the present application describe systems and methods for providing machine readable colored envelopes and systems and methods for processing such envelopes in mail sorting/processing systems. Customers can use colored envelopes to enhance the ornamental effect of a mail piece and/or the sales and marketing potential of the mail piece without affecting the readably of the printed indicia. Thermochromatic multilayer processes transitioning from colorless to colored states have been described. However, in mail processing systems, it may be disadvantageous to apply heat to mail pieces. In certain countries such as Germany, the mailing machine manufacturers are required to demonstrate effectiveness using multi-colored envelopes.

By using negative photochromic (reversible reverse photochromic) dyes, colored envelopes can be produced during the manufacturing process. These envelopes when activated become colorless leaving a white background regardless of the original color in the reverse of the typical photochromic reaction. The reaction only takes place at the time of reading and quickly reverses back to the original color. The customer's choice remains unlimited and even dark colored envelopes which are currently unsuitable can be used. Currently dark envelopes would not allow enough contrast for a postal indicium to be read. However, by producing a white background on demand, the customer may use a wide range of such colors. Additionally, Black ink is becoming a standard for indicium printing in the mailing industry because it provides the highest contrast on the widest variety of envelopes. If the background remains white, even traditional red fluorescent ink (or any other color) can be used for the indicium. There is a large set of photochromic dyes that are widely commercial available, some of which are described herein. These inks have been used in many security applications such as, on checks to verify authenticity and in novelty applications. By coloring the envelope paper with these dyes, they will appear colored to the customer and the recipient but will change to white during the indicia reading operation.

If the systems described herein are not utilized, the USPS may have to restrict the types of envelopes that can be used for value added services. For example, if a customer mails a birthday card in a dark purple envelope and asks for delivery confirmation, the current equipment at the USPS will prevent proper tracking. The contrast of a black ink on a dark envelope will be insufficient for machine readability. The illustrative embodiments disclosed herein will allow to customer to use a dark purple (or any color) envelope that can be changed to white before the tracking barcode is read. Photochromic dyes are molecules that absorb specific light energies and chemically change. In negative photochromic processes, the chemical change results in a switch from a colored to colorless species. This process is reversible when the activation energy is removed. Alternatively, if the colorless state is also stable, then a second activation energy is applied to return to the colored state. The traditional USPS WFOV barcode reader can be used with the addition of a UV strobe light prior to the barcode capturing/reading process.

Referring to FIG. 1, a schematic view 10 of a unit of mail processing/sorting equipment processing a mailpiece having a machine readable colored envelope according to an illustrative embodiment of the present application is shown. An envelope 20 includes a paper substrate having a colored reversible "negative photochromic" dye 21. In an alternative, the reversible photochromic dye 21 may be applied as a coating after envelope 20 is manufactured. The envelope 20 also includes a postal indicium 22 that is printed using traditional red fluorescent ink. The traditional postal sorting equipment is modified to include a Ultraviolet (UV) strobe light 30 to provide the activation energy to change the state of the reversible photochromic dye 21. After the strobe is applies, the dye 21 is bleached and the envelope 20 appears to have a white background. The indicium 22 has much higher contrast against the now white background of envelope 20. At 32, the mail piece is transported to the WFOV camera 40 and the indicium is read. At 34, the mail piece if transported for further processing and the reversible photochromic dye returns to its colored state. In the example, the indicium to be read is a IBIP two dimensional barcode, but any other indicium or markings may be read such as delivery point one dimensional barcodes or other special service markings and routing information.

Figure 2:
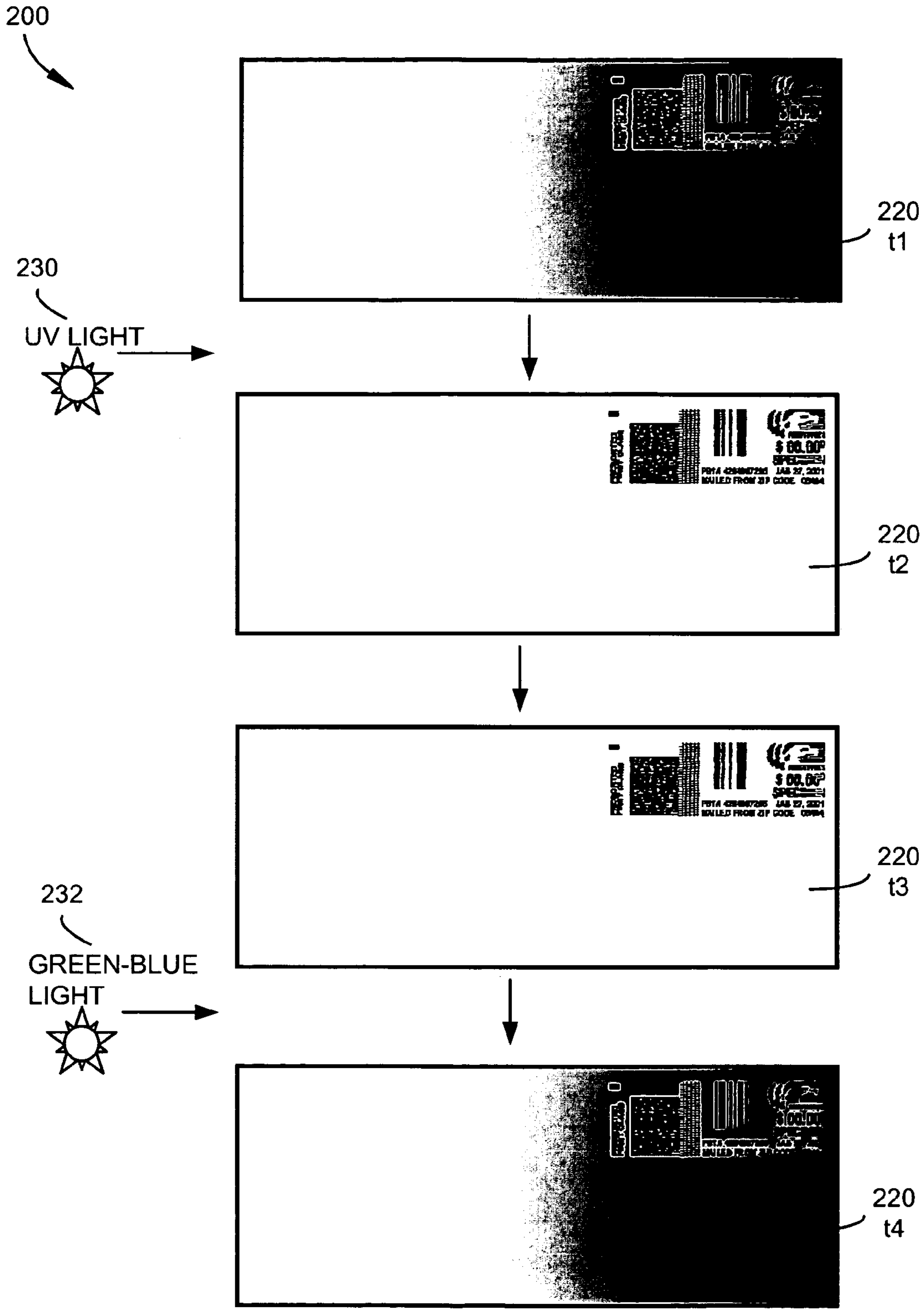
FIG. 2 is a schematic view of a unit of mail processing/sorting equipment processing a mailpiece having a machine readable colored envelope with more than one stable color state according to another illustrative embodiment of the present application.

Referring to FIG. 2, a schematic view 200 of a unit of mail processing/sorting equipment processing a mailpiece having a machine readable colored envelope with more than one stable color state according to another illustrative embodiment of the present application is shown. An envelope 220 includes a paper substrate having a colored reversible "negative photochromic" dye and is shown at time t1 in a colored state. Then UV light 230 is applied to activate the "negative" photochromic dye to bleach the background at time t2. During processing through time t3, the background is bleached because the colorless state is also stable. Then a second activation energy 232 in the Green-Blue range is applied to return the dye to its colored state at time t4 using a photochromic system as described below. There may be significant advantages in using a two stable color state system. For example, in the embodiment above using a one stable color state ink, the UV strobe is used to change the color state from colored to colorless to increase the contrast of the postal indicium or other markings to be read. The color state would then reverse over time to the colored state. There may not be enough time before color reversal to read the indicium in downstream equipment. In a two stable color system, a first transition could be made to the high contrast color state for processing through several pieces of processing equipment and through various stages of the delivery chain. Then as late as just before delivery, the second transition energy may be applied to change the color state back to the low contrast customer friendly color state such as a red Valentine's day envelope.

Figure 3:
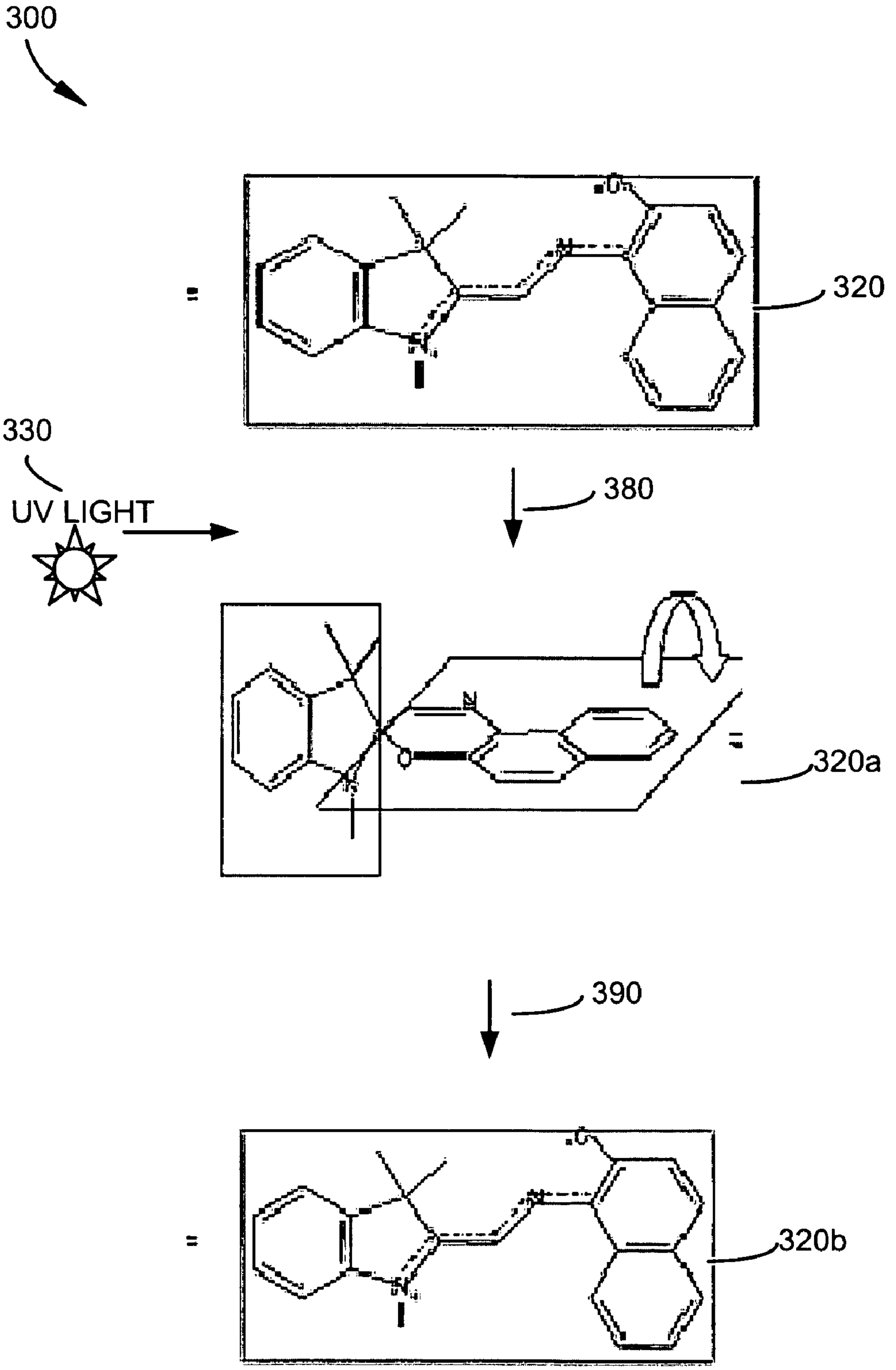
FIG. 3 is a schematic view of a chromophore undergoing color state transition according to an illustrative embodiment of the present application.

Referring to FIG. 3, a schematic view of a chromophore undergoing color state transition 300 according to an illustrative embodiment of the present application is shown. At state 320, the chromophore exists as a single large chromophore in a stable colorless state. In step 380, an excitation source such as UV light 330 is applied that changes the state to color state 320*a* have an unstable two-small-chromophore state that is colorless. Then after a period of time, in step 390, the color state returns to a single large chromophore stable colored state 320*b*.

As shown in the incorporated commonly-owned, co-pending application Ser. No. 11/645,910, entitled "Method and System for Hiding Information," several suitable "negative photochromic" inks are known. Upon exposure to a photochromic excitation source, such as a suitable UV light, the information becomes invisible. Upon removal of the excitation source, the information advantageously becomes visible again. If a chromophore with two stable color states is utilized, then a second energy source would be used to switch back to the colored state.

The material can be tailored to work with different wavelengths and different light intensities. Sources of activation, such as sunlight, may generally be avoided for embodiments of the invention. A broad spectrum white light such as a Halogen lamp may be employed. The activation may be tailored to be, for example, X times a desired intensity to ensure that a special lamp may be used. A suitable UV lamp includes EN-280L (two 8 W bulbs) from Spectronics Corp., New York.

Photochromism is generally understood to mean a light-induced reversible change of color of a substance. During this transition, the color or absorption spectrum of the initial substance changes. The reverse reaction may then be initiated by, for example, exposure to light of a different wavelength, typically a UV light. "Positive" Photochromic substances are used today in applications such as sunglasses that automatically darken when you walk outdoors.

Photochromic dyes/inks are commercially available in a variety of colors from companies such as John Robinson, www.photochromic.co.uk or Spectra Group Limited, www.sglinc.com. The table below shows several Spectra Group Limited Dye Examples, some of which are irreversible "negative photochromics." Examples of materials that are fully reversible include WC AG 1-6 (Blue) and SGL-440 (Red) also from Spectra Group Limited.

TABLE 1

| SPECTRACOLOR | Matrix | Initial Color | Color After Exposure |
|---|---|---|---|
| C QR-ET-NS-M | High solids concentrates | Magenta/Red | Colorless |
| C ER-ET-NS | | Orange | Colorless |
| C WC Ag 1-8 | Waterborne concentrates | Blue | Colorless |
| C WC TU1 | Concentrate in acrylate monomer, miscible with water | Blue | Colorless |
| SGL-440 | Waterborne concentrates | Red | Colorless |
| C ER-ET(M) | Solventbourne concentrate in acetone | orange | magenta |

For example, in the last example in TABLE 1, the color changes state from a darker color orange to a lighter color magenta when activated. In an alternative applicable to any of the embodiments, the colored envelope includes only a small portion of reversible photochromatic or thermochromatic ink in the indicium area with a matched color coated on the rest of the envelope. Of course, the ink can be used to dye the substrate material during substrate manufacturing or could alternatively be applied as a coating over manufactured substrate envelopes. Alternatively, known reversible photochromatic chromophores have two stable color states may be utilized. Additional photochromic inks that may be utilized are described in U.S. Pat. No. 6,858,564 B2, issued Feb. 22, 2005 to Halbrook, Jr., et al. Organic photochromic dyes may be utilized.

Multi-state photochromic materials are known and may be used. For example, one described system includes a Photochromic-doped sol-gel material prepared by adding a spiropyran photochromic dye to a solution of ethoxy silane monomers containing non-reacting ethyl radicals. After polymerization, normal photochromism (i.e., colored material upon UV irradiation) is obtained in the resulting matrix. The sol-gel matrix hinders the organic molecule rotations, thus giving two stable states, which can be reversibly switched by UV and green-blue irradiation respectively.

In the envelopes described, there may be significant advantages in processing to placing the reversible photochromic and negative reversible photochromic dyes in the paper slurry during the manufacturing process instead of printing on the envelopes after envelope manufacture.

Figure 4:
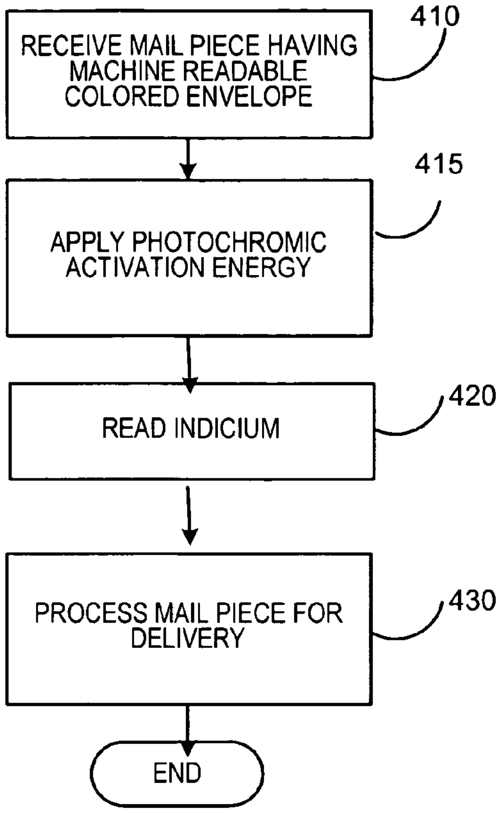
FIG. 4 is a flow chart describing a process for processing a machine readable colored envelope according to an illustrative embodiment of the present application.

Referring to FIG. 4 a flow chart describing a process for processing a machine readable colored envelope according to an illustrative embodiment of the present application is shown. In step 410, the process receives a mail piece having a machine readable colored envelope as described herein. In step 415, the system applies a photochromic activation energy in order to change the color state of the photochromic dye from a colored to a colorless state. In this example, the colorless state is also stable. Here, the photochromic activation energy is in the UV band, but other suitable excitation sources may be utilized depending on the types of dyes expected by the system. In step 420, the system reads the indicium using the traditional optical reading system such as a WFOV camera to read a 2D barcode. In step 430, the mail piece is transported for further processing.

EXAMPLES

In one example, a WC Ag 6 Ink from Spectra Group Limited was drawn down on a white envelope using KCC101 coater with #2 coating rod. This resulted in a blue coating on top of the envelope. A red fluorescent indicia was printed using a Pitney Bowes mailing machine on the envelope. The maximum contrast of a Pitney Bowes red fluorescent ink on a white envelope is approximately 45%. The barcode was then tested on two commercially available barcode verifiers. The envelope was then exposed to high intensity white LED lighting for 20 seconds turning the envelope from blue from white. The barcode was read on the same verifiers and the contrast improved ~33%. On the LVS Integra 95 the error correction rate also went down by ~40%. The results are shown below in TABLE 2.

TABLE 2

| Barcode Verifier | Contrast Before Activation | Contrast After Activation | Unused Error Correction Codes Before Activation | Unused Error Correction Codes After Activation |
|---|---|---|---|---|
| Siemens RVSI DMX Verifier+ | 30% | 45% | 100% | 100% |
| LVS Integra 9500 | 27% | 42% | 55% | 97% |

In a second example shown in TABLE 3, the SGL-440 Ink from Spectra Group limited was drawn down on a white envelope using KCC101 coater with #2 coating rod. This resulted in a red coating on top of the envelope. A red fluorescent indicia was printed using a Pitney Bowes mailing machine on the envelope. The maximum contrast of a Pitney Bowes red fluorescent ink on a white envelope is approximately 45%. The barcode was then tested on two commercially available barcode verifiers. The envelope was then exposed to high intensity white LED lighting for 20 seconds turning the envelope from red from white. The barcode was read on the same verifiers and the contrast improved ~50%. On the LVS Integra 95 the error correction rate also went down by ~50%.

TABLE 3

| Barcode Verifier | Contrast Before Activation | Contrast After Activation | Unused Error Correction Codes Before Activation | Unused Error Correction Codes After Activation |
|---|---|---|---|---|
| Siemens RVSI DMX Verifier+ | 18% | 41% | 100% | 100% |
| LVS Integra 9500 | 23% | 44% | 55% | 97% |

Additionally, two comparative samples were performed. In a first comparative example, a Blue non-photochromic dye was used as shown in TABLE 4. A mixture of 2.5% Triethlyene glycol mono n butyl ether, 20% Duasyn Direct Turquoise Blue FRL-SF (Clariant Corp.) and 77.5% $H_2O$ was mixed with a magnetic stirrer in a beaker. The mixture was drawn down on a white envelope using KCC101 coater with #2 coating rod. This resulted in a blue coating on top of the envelope. A red fluorescent indicia was printed using a Pitney Bowes mailing machine on the envelope. The maximum contrast of a Pitney Bowes red fluorescent ink on a white envelope is approximately 45%. The barcode was then tested on two commercially available barcode verifiers. The envelope was then exposed to high intensity white LED lighting for 20 seconds, the envelope did not change color. The barcode was read on the same verifiers and the contrast and error rate did not change.

TABLE 4

| Barcode Verifier | Contrast Before Activation | Contrast After Activation | Unused Error Correction Codes Before Activation | Unused Error Correction Codes After Activation |
|---|---|---|---|---|
| Siemens RVSI DMX Verifier+ | 24% | 24% | 100% | 100% |
| LVS Integra 9500 | 24% | 24% | 100% | 100% |

In the second comparative example summarized in TABLE 5, a Red non-photochromic dye was used. A mixtured of 2.5% Triethlyene glycol mono n butyl ether, 20% Duasyn Red 3B-SF (Clariant Corp) and 77.5% $H_2O$ was mixed with a magnetic stirrer in a beaker. The mixture was drawn down on a white envelope using KCC101 coater with #2 coating rod. This resulted in a red coating on top of the envelope. A red fluorescent indicia was printed using a Pitney Bowes mailing machine on the envelope. The maximum contrast of a Pitney Bowes red fluorescent ink on a white envelope is approximately 45%. The barcode was then tested on two commercially available barcode verifiers. The envelope was then exposed to high intensity white LED lighting for 20 seconds, the envelope did not change color. The barcode was read on the same verifiers and the contrast and error rate stayed approximately the same.

TABLE 5

| Barcode Verifier | Contrast Before Activation | Contrast After Activation | Unused Error Correction Codes Before Activation | Unused Error Correction Codes After Activation |
|---|---|---|---|---|
| Siemens RVSI DMX Verifier+ | 14% | 14% | 96% | 96% |
| LVS Integra 9500 | 20% | 20% | 58% | 62% |

Figure 5:
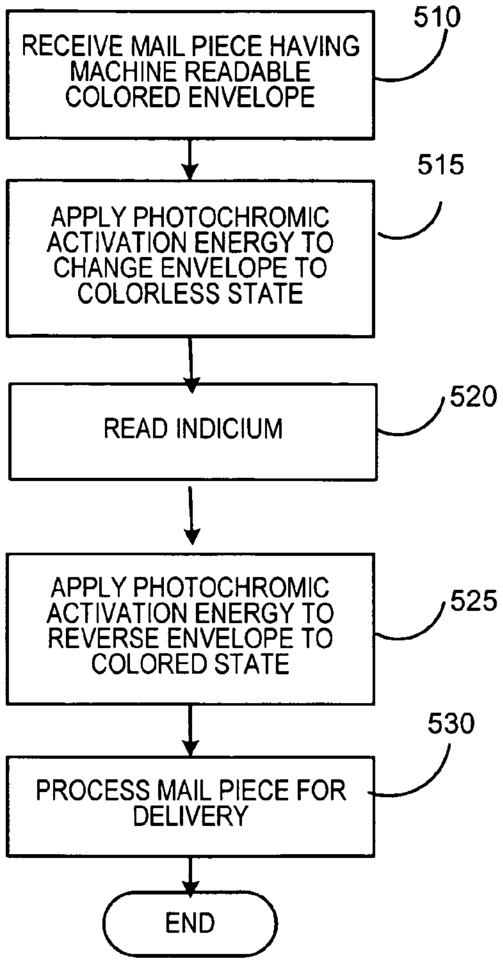
FIG. 5 is a flow chart describing a process for processing a machine readable colored envelope having more than one stable color state according to an illustrative embodiment of the present application.

Referring to FIG. 5 a flow chart describing a process for processing a machine readable colored envelope having more than one stable color state according to an illustrative embodiment of the present application is shown. In step 510, the process receives a mail piece having a machine readable colored envelope as described herein. In step 515, the system applies a photochromic activation energy in order to change the color state of the photochromic dye from a colored to a colorless state. In this example, the colorless state is also stable. Alternatively, the color state change is from a relatively dark color to a relatively light color in order to provide improved contrast. Here, the photochromic activation energy is in the UV band, but other suitable excitation sources may be utilized depending on the types of dyes expected by the system. In step 520, the system reads the indicium using the traditional optical reading system such as a WFOV camera to read a 2D barcode. In step 525, the system then applies a second photochromic activation energy in order to return to the colored state. In step 530, the mail piece is transported for further processing.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. In addition, the concepts of the present invention are not limited to application in the area of postal indicia printing, but may also be used in connection with other devices benefiting from better contrast. Accordingly, the invention is not to be considered as limited by the foregoing description.

I claim:

1. A machine-readable color envelope comprising:

a paper dyed with a reversible negative photochromic dye, such that the paper substrate forms an envelope-shaped container and the color of the paper substrate over the entire outside surface of the envelope-shaped container is controlled by the reversible negative photochromic dye; and a postal indicium, printed on the paper substrate;

wherein applying a first photochromic activation energy to the machine-readable color envelope changes the color of the paper substrate in the background of the area over which the postal indicium is printed from a first paper substrate color state to a second paper substrate color state;

wherein applying a second photochromic activation energy to the machine-readable color envelope, or the passing of a period of time, changes the color of the paper substrate in the background of the area over which the postal indicium is printed from the second paper substrate color state to the first paper substrate color state; and wherein the readability of the postal indicium by a machine is improved when the color of the paper substrate in the background of the area over which the postal indicium is printed is in the second paper substrate color state, compared to when the color of the paper substrate in the background of the area over which the postal indicium is printed is in the first paper substrate color state.

2. The machine-readable color envelope of claim 1, wherein the reversible negative photochromic dye is colored when the color of the paper substrate is in the first paper substrate color state, and wherein the reversible negative photochromic dye is colorless when the color of the paper substrate is in the second paper substrate color state.

3. The machine-readable color envelope of claim 2, wherein the reversible negative photochromic dye has a dye color state selected from the group consisting of magenta, red, orange, and blue.

4. The machine-readable color envelope of claim 2, wherein the reversible negative photochromic dye is applied to the paper substrate as a coating and is in an aqueous solution before coating the paper substrate.

5. The machine-readable color envelope of claim 1, wherein the reversible negative photochromic dye has at least two stable dye color states.

6. The machine-readable color envelope of claim 5, wherein the reversible negative photochromic dye has a first stable dye color state activated by the first photochromic activation energy and a second stable dye color state activated by the second photochromic activation energy.

7. The machine-readable color envelope of claim 6, wherein the first photochromic activation energy is a UV band light and the second photochromic activation energy is a green-blue band light.

8. The machine-readable color envelope of claim 1, wherein the reversible negative photochromic dye is applied to the paper substrate as a coating.

9. The machine-readable color envelope of claim 1, wherein the reversible negative photochromic dye is dark-colored when the color of the paper substrate is in the first paper substrate color state, and wherein the reversible negative photochromic dye is light-colored when the color of the paper substrate is in the second paper substrate color state.

10. A method for reading an indicium on a mail piece comprising:

receiving the mail piece, the mail piece comprising:

a paper substrate dyed with a reversible negative photochromic dye, such that the paper substrate forms an envelope-shaped container and the color of the paper substrate over the entire outside surface of the envelope-shaped container is controlled by the reversible negative photochromic dye; and a postal indicium, printed on the paper substrate;

applying a first photochromic activation energy to the mail piece, wherein applying the first photochromic activation energy to the mail piece changes the color of the paper substrate in the background of the area over which the postal indicium is printed from a first state to a second state;

reading the postal indicium by a machine after applying the first photochromic activation energy to the mail piece;

allowing the passing of a period of time to change the color of the paper substrate in the background of the area over which the postal indicium is printed from the second state to the first state; and delivering the mail piece;

wherein the readability of the postal indicium by the machine is improved when the color of the paper substrate in the background of the area over which the postal indicium is printed is in the second state, compared to when the color of the paper substrate in the background of the area over which the postal indicium is printed is in the first state.

11. The method of claim 10 wherein the first photochromic activation energy is a UV band light.

12. A method for reading an indicium on a mail piece comprising:

receiving the mail piece, the mail piece comprising:

a paper substrate dyed with a reversible negative photochromic dye, such that the paper substrate forms an envelope-shaped container and the color of the paper substrate over the entire outside surface of the envelope-shaped container is controlled by the reversible negative photochromic dye; and a postal indicium. printed on the paper substrate;

applying a first photochromic activation energy to the mail piece, wherein applying the first photochromic activation energy to the mail piece changes the color of the paper substrate in the background of the area over which the postal indicium is printed from a first state to a second state;

reading the postal indicium by a machine after applying the first photochromic activation energy to the mail piece;

applying a second photochromic activation energy to the mail piece after reading the postal indicium, wherein applying the second photochromic activation energy to the mail piece changes the color of the paper substrate in the background of the area over which the postal indicium is printed from the second state to the first state; and transporting the mail piece;

wherein the readability of the postal indicium by the machine is improved when the color of the paper substrate in the background of the area over which the postal indicium is printed is in the second state, compared to when the color of the paper substrate in the background of the area over which the postal indicium is printed is in the first state.

13. The method of claim 12 wherein the first photochromic activation energy is a UV band light and the second photochromic activation energy is a green-blue band light.

* * * * *